United States Patent [19]

Shiramizu

[11] Patent Number: 5,261,086
[45] Date of Patent: Nov. 9, 1993

[54] PERFORMANCE ANALYZING AND DIAGNOSING SYSTEM FOR COMPUTER SYSTEMS

[75] Inventor: Akira Shiramizu, Tokyo, Japan
[73] Assignee: NEC Corporation, Tokyo, Japan
[21] Appl. No.: 963,018
[22] Filed: Oct. 19, 1992

Related U.S. Application Data

[63] Continuation of Ser. No. 758,499, Sep. 6, 1991, abandoned, which is a continuation of Ser. No. 261,907, Oct. 25, 1988, abandoned.

[30] Foreign Application Priority Data

Oct. 26, 1987 [JP] Japan .............. 62-270824
Oct. 30, 1987 [JP] Japan .............. 62-275359

[51] Int. Cl.⁵ .............. G06F 11/00; G01R 31/28
[52] U.S. Cl. .................. 395/575; 395/54; 395/75; 395/77; 364/DIG. 1; 364/274.3; 364/274.5; 364/274.2; 364/275.7; 364/267; 371/15.1
[58] Field of Search ............ 371/15.1; 395/51, 54, 395/75, 77, 575

[56] References Cited

U.S. PATENT DOCUMENTS

| | | | |
|---|---|---|---|
| 4,642,782 | 2/1987 | Kemper et al. | 364/554 |
| 4,654,852 | 3/1987 | Bentley et al. | 364/900 |
| 4,709,366 | 11/1987 | Scott et al. | 371/29.1 |
| 4,817,092 | 3/1989 | Denny | 371/11.3 |
| 4,841,456 | 6/1989 | Hogan, Jr. et al. | 364/550 |
| 4,918,620 | 4/1990 | Ulng | 395/75 |

OTHER PUBLICATIONS

Williamson, Mickey, "Artificial Intelligence for Microcomputers", The Guide for Business Decision Makers, 1986, pp. 105-113.
Lee Brownston et al., "Programming Expert Systems in OPS5, An Introduction to Rule-Based Programming", 1985, pp. 42-46 and 140-142.
"Fault Diagnosis", Thomas J. Laffey, IEEE potentials-Oct. 1986, pp. 8-11.

*Primary Examiner*—Eddie P. Chan
*Attorney, Agent, or Firm*—Foley & Lardner

[57] ABSTRACT

A performance analyzing and diagnosing system enables a user with little knowledge or experience to evaluate the performance of a computer system. An external memory stores know-how rules and declaratively represented rules needed to solve a performance problem of the computer system. The know-how rules are based on a problem solving method an expert might apply to the problem and may be in IF-THEN format. The declaratively represented rules provide information concerning the computer system. A work area processor, after receipt of a start instruction from an input/output unit, develops the know-how rules and the declaratively represented rules. A performance analysis/diagnosis information output means derives a solution to the performance problem and outputs a solution to the input/output unit.

3 Claims, 8 Drawing Sheets

FIG. 2

| Record ID | Record length | Sampling time | Interval time | | 3a |
|---|---|---|---|---|---|
| Name of medium used | | No. of inputs and outputs | | Input/ | |
| output time | Unused space | | | | |

| | Record ID | Record length | Sampling time | interval |
|---|---|---|---|---|
| time | Name of medium used | | No. of inputs and outputs | |
| Input/output time | | Unused space | | |

| | Record ID | Record length | Sampling time | interval |
|---|---|---|---|---|
| time | Name of medium used | | No. of missing page faults in whole system | |
| No. of missing page faults in system domain | | | No. of missing page faults in user | |
| domain | | | | |

FIG. 3

| Unit ID | Record length | Superior unit ID | Type of unit | 17 |
|---|---|---|---|---|
| State of unit | | | | |

| | Unit ID | Record length | Superior unit ID | Type of |
|---|---|---|---|---|
| unit | State of unit | | | |

(RULE x: IF the frequency of missing page faults>10 times
THEN there are many missing page faults)
(RULE y: IF the frequeny of missing page faults <=10 times
THEN there are few missing page faults)
(RULE z: IF there are many missing page faults
THEN check how the main memory unit is used)

FIG. 7

(Record ID III
    (Sampling time   87-07-30/ 20:00)
    (Interval time 60)
    (Name of medium used  MS01)
    (No. of inputs and outputs  122)
    (Input/output time 36600
    (Unused space 3512)
)
(Record ID III
    (Sampling time   87-07-30/20:09)
    (Interval time 60)
    (Name of medium used MS03)
    (No. of inputs and outputs 83)
    (Input/output time 3320)
    (Unused space   4011)
)

FIG. 10

> \>
> Is addition to the main memory capacity possible ?
> \> YES
> Can 4 MB be added to the main memory capacity ?
> \> NO
> How many MB can be added to the main memory capacity:
> \> 2

FIG. 11

> \>
> The result of diagnosis is outputted now.
>
> There are frequent missing page faults posing a performance problem, because of the insufficient capacity of the main memory unit.
>
> Add 2 MB to the main memory capacity.
>
> \>

PERFORMANCE ANALYZING AND DIAGNOSING SYSTEM FOR COMPUTER SYSTEMS

This application is a continuation of application Ser. No. 07/758,499, filed Sep. 6, 1991, now abandoned, which is a continuation of application Ser. No. 07/261,907, filed Oct. 25, 1988, now abandoned.

BACKGROUND OF THE INVENTION

The present invention relates to a performance analyzing and diagnosing system for computer systems.

In performance analysis of a computer system by the prior art, the user himself analyzes data concerning the operating state of the system which has been successively collected by the monitoring function of the system and supplied to the user from its output apparatus. In this method of analysis, the user must count on his own knowledge and experience or must consult with an expert to identify problems and decide on solutions thereto. Since this analysis demands a wealth of knowledge and experience by the user himself, this method of analysis cannot be applied by all users of the computer system. Consultation with an expert would also cost the user much labor and time, which hinders efficient performance analysis.

SUMMARY OF THE INVENTION

One object of the present invention is, therefore, to provide a performance analyzing and diagnosing system for computer systems, which would enable even a layman with little knowledge and experience to efficiently evaluate the performance of the computer system he uses.

According to one aspect of the present invention, there is provided a performance analyzing and diagnosing system, which includes:

an external memory for storing know-how rules and declaratively represented rules, both of which are needed for solving a performance problem in a computer system;

an input/output unit, responsive to an instruction from a user, for starting performance analysis/diagnosis processing;

a work area unit, responsive to a start instruction from the input/output unit, for developing said know-how rules and declaratively represented rules from said external memory; and a performance analysis/diagnosis information output unit for repeating catenation of, reference to and updating of judgments based on the know-how rules and declaratively represented rules developed by the work area unit to derive a solution to the performance problem of the computer system, and for outputting the solution via said input/output unit.

BRIEF DESCRIPTION OF THE DRAWINGS

The above and other features and advantages of the present invention will be made more apparent from the detailed description hereunder when taken in conjunction with the accompanying drawings, in which:

FIG. 4 illustrates specific examples of the know-how rules 5a and 14a;

In the drawings, the same reference numerals denote respectively the same elements.

DETAILED DESCRIPTION OF THE PREFERRED EMBODIMENT

Figure 1:
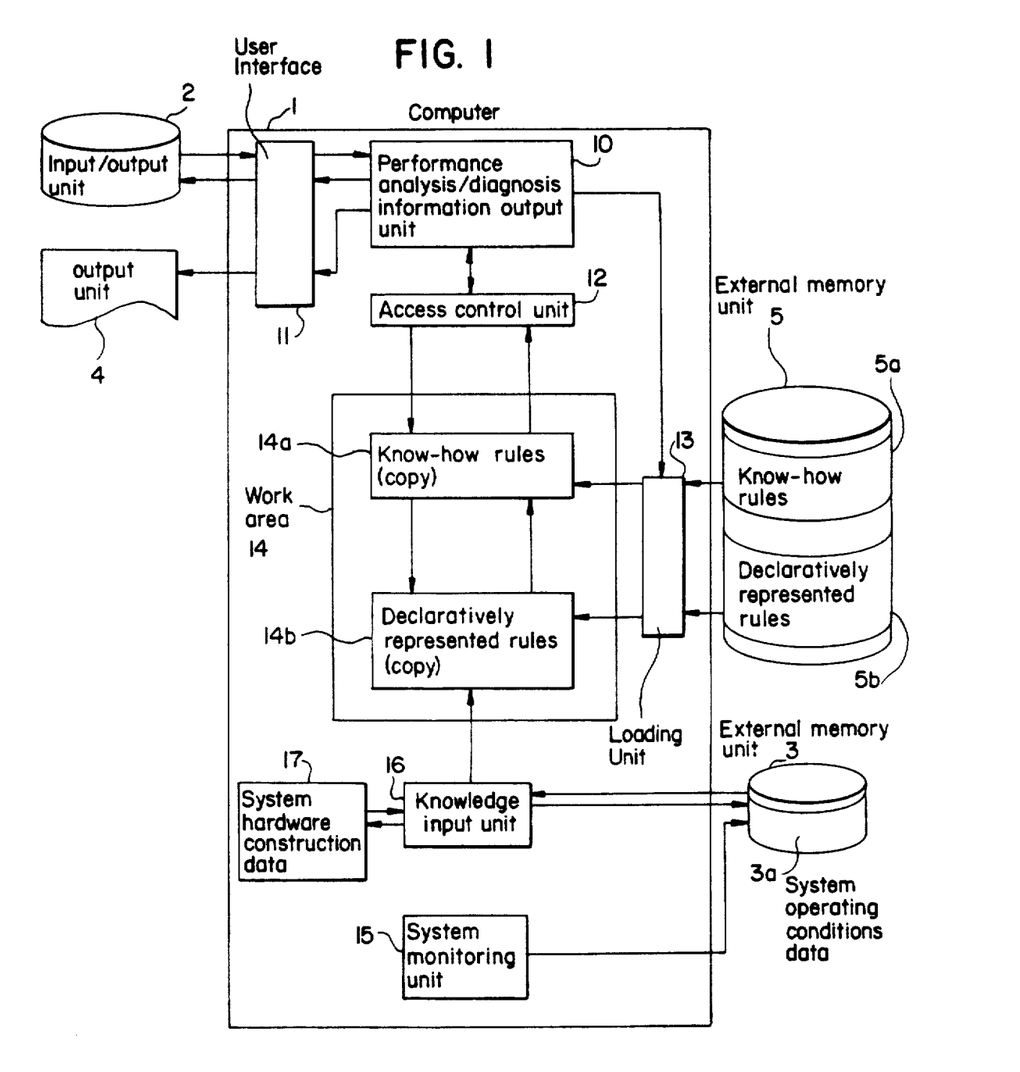
FIG. 1 is a diagram of a preferred embodiment of the invention.

Referring to FIG. 1, a preferred embodiment of the present invention comprises a computer 1 having a central processing unit and a main memory unit (neither of which is shown), an I/O unit 2 having a display unit and an input unit, an output unit 4 which may be a printer, and external memory units 3 and 5, the latter for storing know-how rules 5a and declaratively represented rules 5b.

The computer 1 has a performance analysis/diagnosis information output unit 10 for analyzing and diagnosing the performance of the computer system and for providing output messages; a user interface 11 for exchanging information between performance output unit 10 analysis/diagnosis information and the I/O unit 2 and the output unit 4; a loading unit 13, responsive to an instruction from the performance analysis/diagnosis information output unit 10 for reading the know-how rules 5a and the declaratively represented rules 5b from the external memory unit 5; a work area 14 for developing and storing the know-how rules copy 14a and the declaratively represented rules copy 14b provided from the loading unit 13; access control unit 12 for controlling access to the work area 14 by the performance analysis/diagnosis information output unit 10; a system monitoring unit 15 for collecting various data indicating the operating conditions of the computer system and for storing the data as system operating conditions data 3a in the external memory unit 3; system hardware construction data 17 indicating the construction of the system hardware; and knowledge input means 16 for incorporating system hardware construction data 17 and the system operating conditions data 3a into the declaratively represented rules copy 14b in the work area 14. In the main memory unit of the computer 1 are stored the work area 14, system monitoring unit 15, knowledge input unit 16 and system hardware construction data (hereunder called "SHC data") 17.

Figure 2:
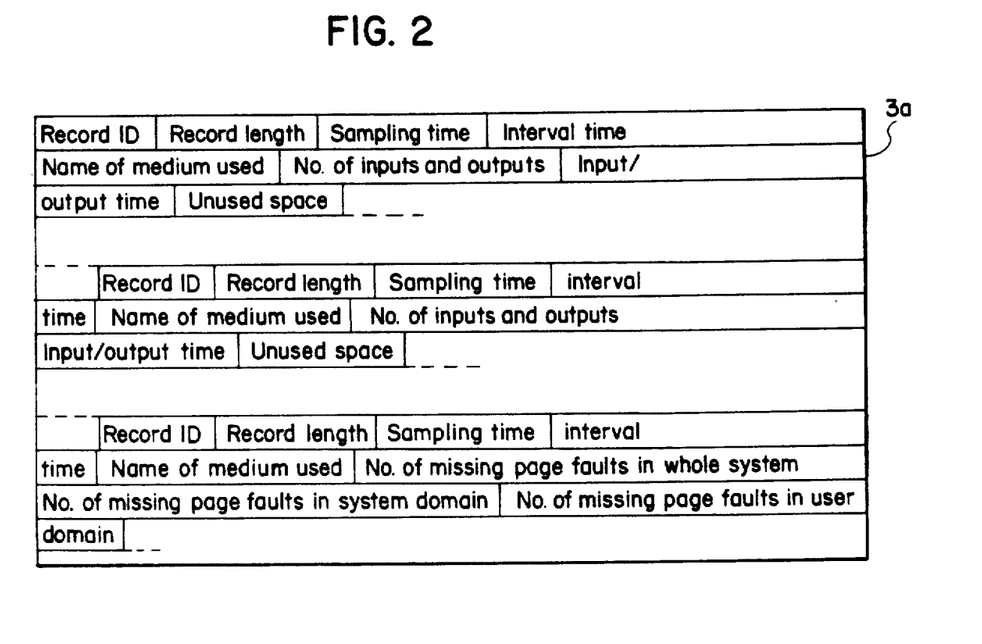
FIG. 2 is a diagram of a storage format of system operating conditions data 3a in an external memory unit 3 shown in FIG. 1.

Referring now to FIG. 2, the system operating conditions data 3a are stored on a function-by-function basis and at regular intervals, one record at a time. Although the internal form of the records differs from function to function, they have the common feature of being outputted at regular intervals.

Figure 3:
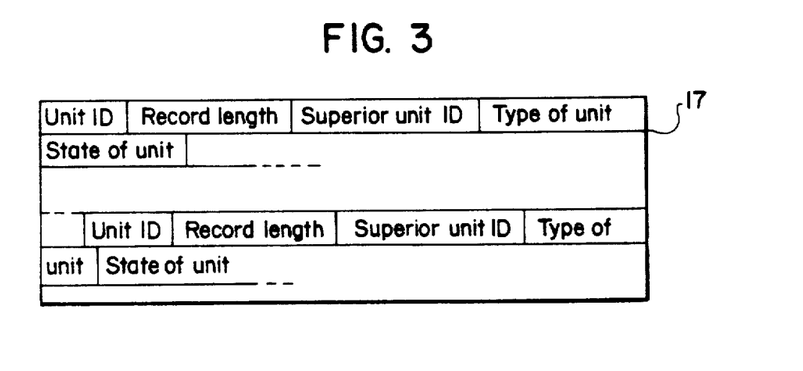
FIG. 3 is a diagram of a storage format of system hardware construction data 17.

Referring to FIG. 3, the SHC data 17 are stored in the main memory unit for every constituent element of hardware, information on each unit constituting one record.

In order to realize the performance analysis/diagnosis system according to the present invention, first the know-how rules 5a and the declaratively represented rules 5b should be stored in the external memory unit 5. These sets of rules 5a and 5b include knowledge, experience, know-how and the contents of various documents (hereinafter collectively referred to as knowledge, etc.) kept and used by experts in evaluating the performance of computer systems. The know-how rules 5a include a grouped body of knowledge etc. expressed in normative sentences taking the IF-THEN format. These know-how rules 5a and the copy 14a thereof have an IF-THEN format which permits deciphering of the contents when referred to by the access control means 12. Experts on performance problems of computer systems, when trying to work out solutions to problems, are presumably thinking in the IF-THEN sequence. Not only computer performance experts but also all human beings are likely pass judgments in the IF-THEN sequence. Therefore, this is the best conceivable method of realization for these know-how rules 5a. Further, in order to improve a system according to the invention, it is desirable to have the know-how rules 5a reflect the knowledge etc. comprehensively.

Figure 4:
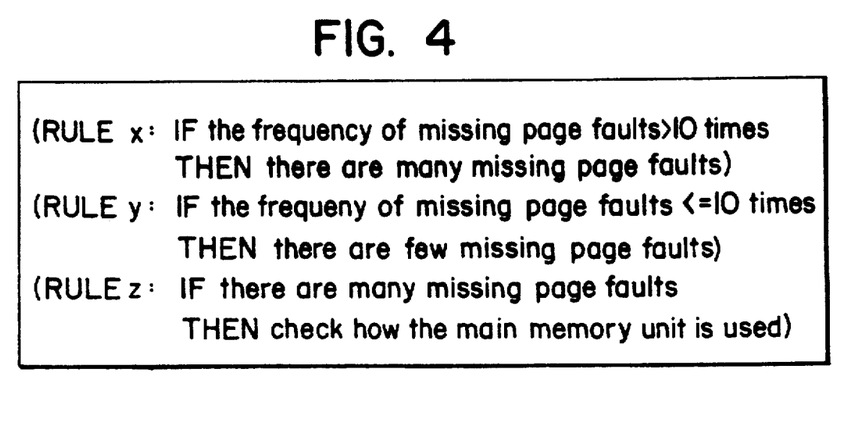

Next will be described in detail these know-how rules 5a, or the copy 14a thereof, with reference to FIG. 4 illustrating specific examples of such rules.

FIG. 4 shows examples of know-how held by experts about the performance problems of computer systems concerning the frequency of missing page faults in the main memory unit, expressed as empirical rules. Suppose that an expert about performance problems of computer systems has a piece of know-how that "if the frequency of missing page faults in a computer system is over 10 per second, a performance problem is likely to occur to the system; therefore its cause should be investigated by breaking down the problem into finer details." In the know-how rules 5a, this piece of know-how is expressed in this way: "IF the frequency of missing page faults >10 times, THEN there are many missing page faults." "IF there are many missing page faults, THEN check how the main memory unit is used." A grouped body of normative sentences expressed in this manner constitutes the know-how rules 5a.

Meanwhile, the declaratively represented rules 5b include a grouped body of items of information, which are structurally such as performance particulars, a group of data indicating the operating conditions and the hardware construction (hereinafter collectively referred to as hardware construction, etc.) of the computer system, out of all the knowledge needed for solving the system's performance problems.

Figure 5:
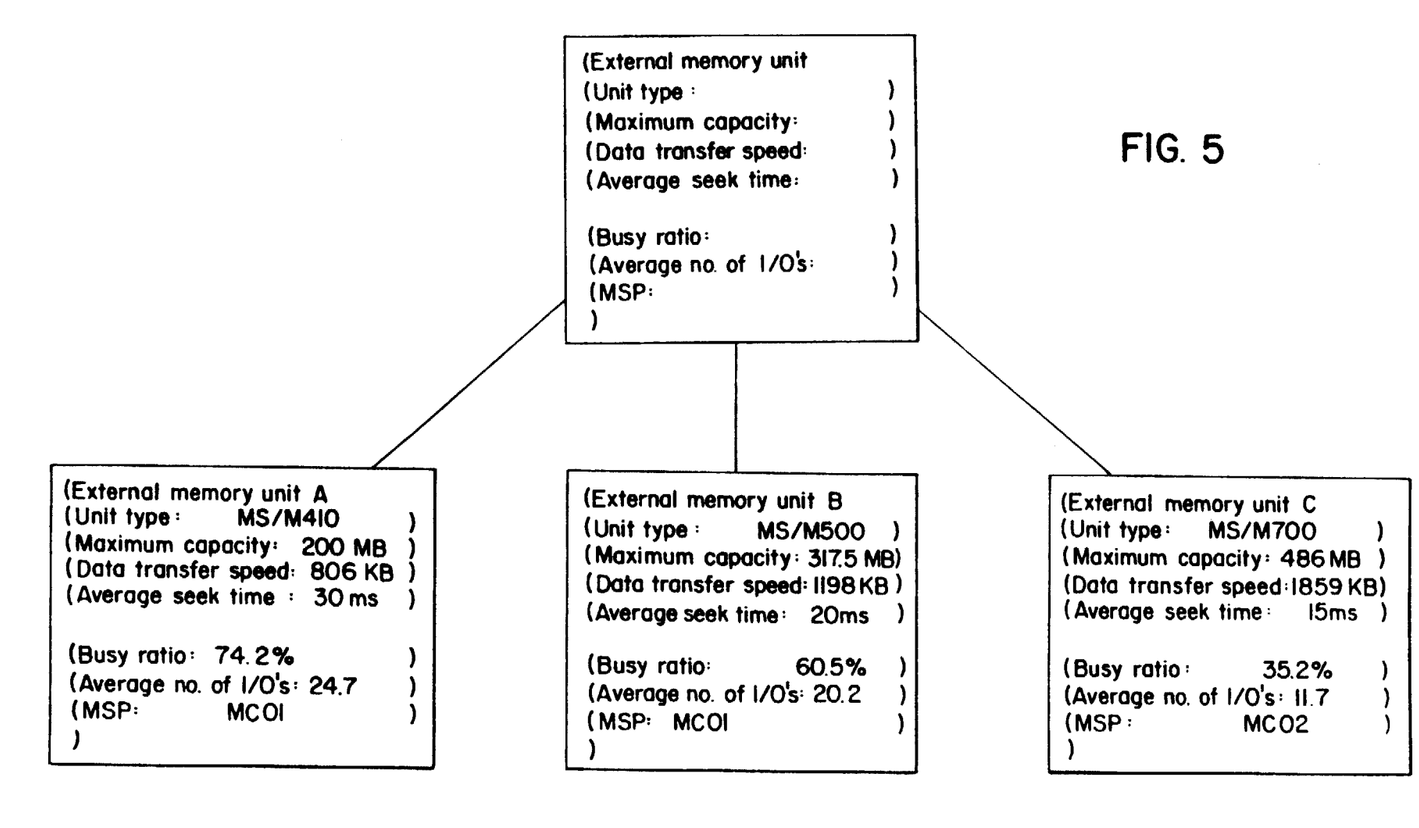
FIG. 5 illustrates specific examples of declaratively represented rules 5b and 14b.

Next will be described in detail the declaratively represented rules copy 14b in the work area 14 with reference to FIG. 5, illustrating specific examples thereof.

FIG. 5 shows examples of the hardware construction, etc., expressed as declaratively represented rules with respect to the external memory unit 5 of FIG. 1. The general concept of an external memory unit can involve many variables indicating its features including the type of hardware, maximum capacity, data transfer speed and average seek time. By assigning specific values to these variables, the individual external memory units actually existing for a given computer system can be characterized. External memory units A, B and C are specific embodiments of the general concept of external memory unit and the same variables are assigned for them. These units A, B and C are distinguished from one another by specific values, and the actual operational data on the computer system and hardware construction information can also be set as variables.

Next will be described in detail the operation of an embodiment of the invention with reference to FIGS. 1 through 11.

Referring to FIG. 1, when the computer system is operating, the system monitoring unit 15 periodically collects various data indicating the operating conditions of the computer system, and stores the data as the system operating conditions data 3a in the external memory unit 3. In the main memory unit of the computer 1 are stored the SHC data 17.

The knowledge input unit 16 selects, out of the system operating conditions data 3a and SHC data 17, a group of data indicating conditions that fail to satisfy the performance goal values and a group of data concerning related units. The data groups, though massive in quantity, are quantitative in content. It would be extremely inefficient for the system's performance to use all the massive groups of data as pertinent knowledge. Experts on performance problems have performance goal standard values for the data groups. However, since the number of items of such values is only one or two per record, they can be relatively simply classified. Taking advantage of this characteristic, the knowledge input unit 16 narrows down the number of data groups.

Next will be described in detail the processing of the system operating conditions data 3a by the knowledge input unit 16 with reference to FIGS. 1 to 3 and 6 to 8.

Figure 6:
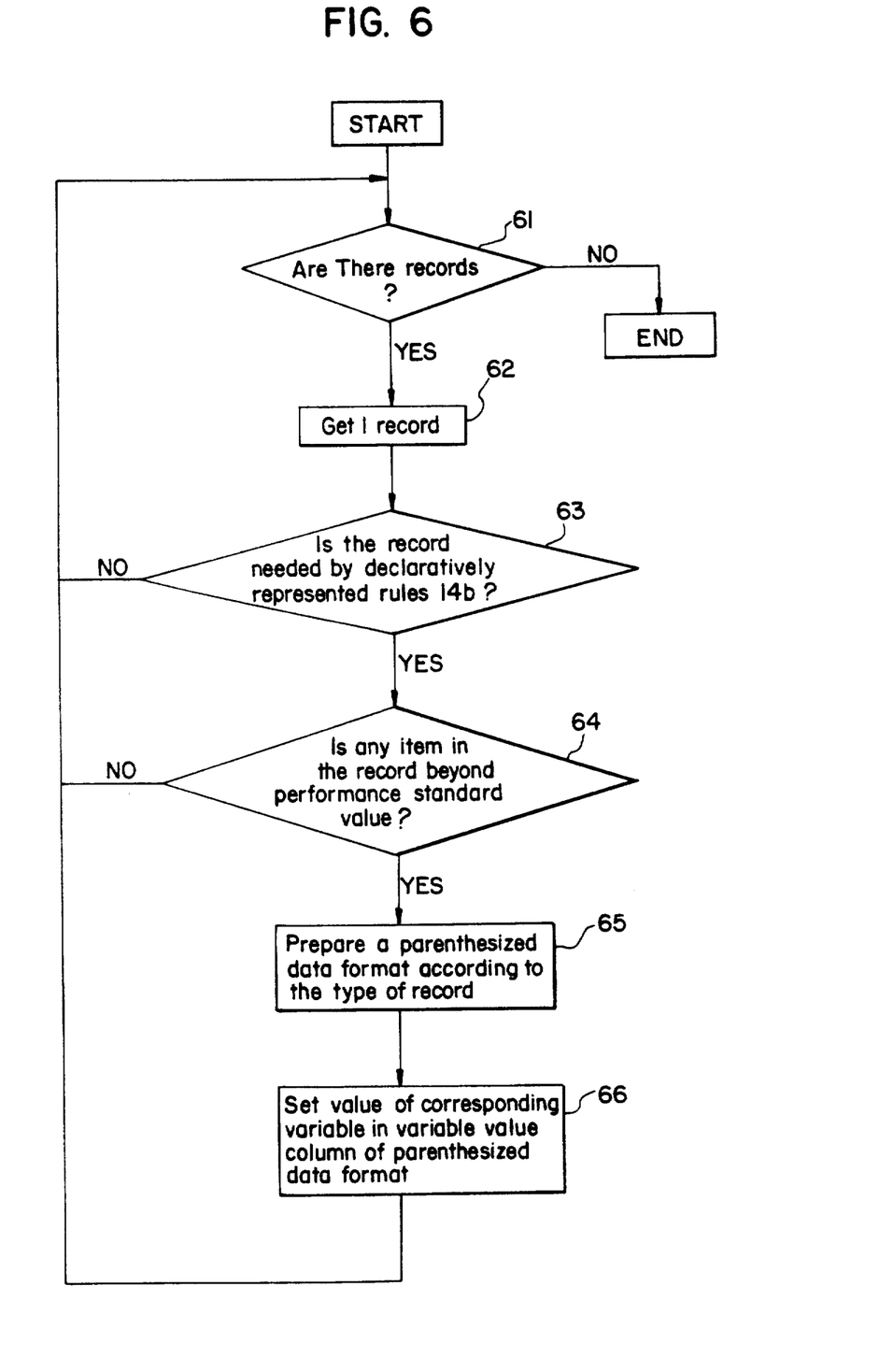
FIG. 6 is a diagram for explaining the processing of system operating conditions data 3a by knowledge input unit 16 shown in FIG. 1.
Figure 7:
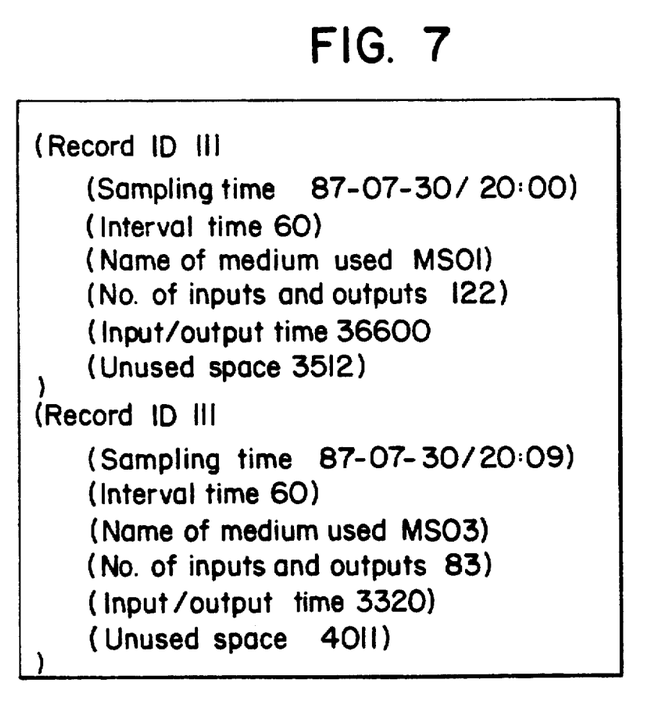
FIG. 7 illustrates the result of conversion of the storage format of FIG. 2 in said knowledge input unit 16.

Referring first to FIGS. 1, 2 and 6, the knowledge input unit 16 decides whether or not any records exist in the system operating conditions data 3a of the external memory unit 3 (step 61). In response to an affirmative decision at this step 61, one of the records is readout (step 62). Then it is decided whether or not the record readout is required by the declaratively represented rules 14b (step 63). In response to an affirmative decision at this step 63, it is decided whether or not any item in the record exceeds the performance goal standard value for that item (step 64). In response to an affirmative decision at this step 64, a parenthesized data format is prepared according to the type of record (step 65). The knowledge input unit converts the narrowed-down data groups into a parenthesized data format as shown in FIG. 7. Since the length of a single record is given as information, the data group for each category of data is divided by that length. Along with that, by utilizing the characteristic that the data length is fixed for the structural elements of each record, the data groups are divided on an element-by-element basis. The knowledge input unit 16 allocates the data so that each of the elements corresponds to the information within a set of parentheses. The contents of each set of parentheses are the item (name of variable) and a specific value for the item (value of variable). Thus is set the converted value of each variable in the value of variable column of the parenthesized data format (step 66).

Figure 8:
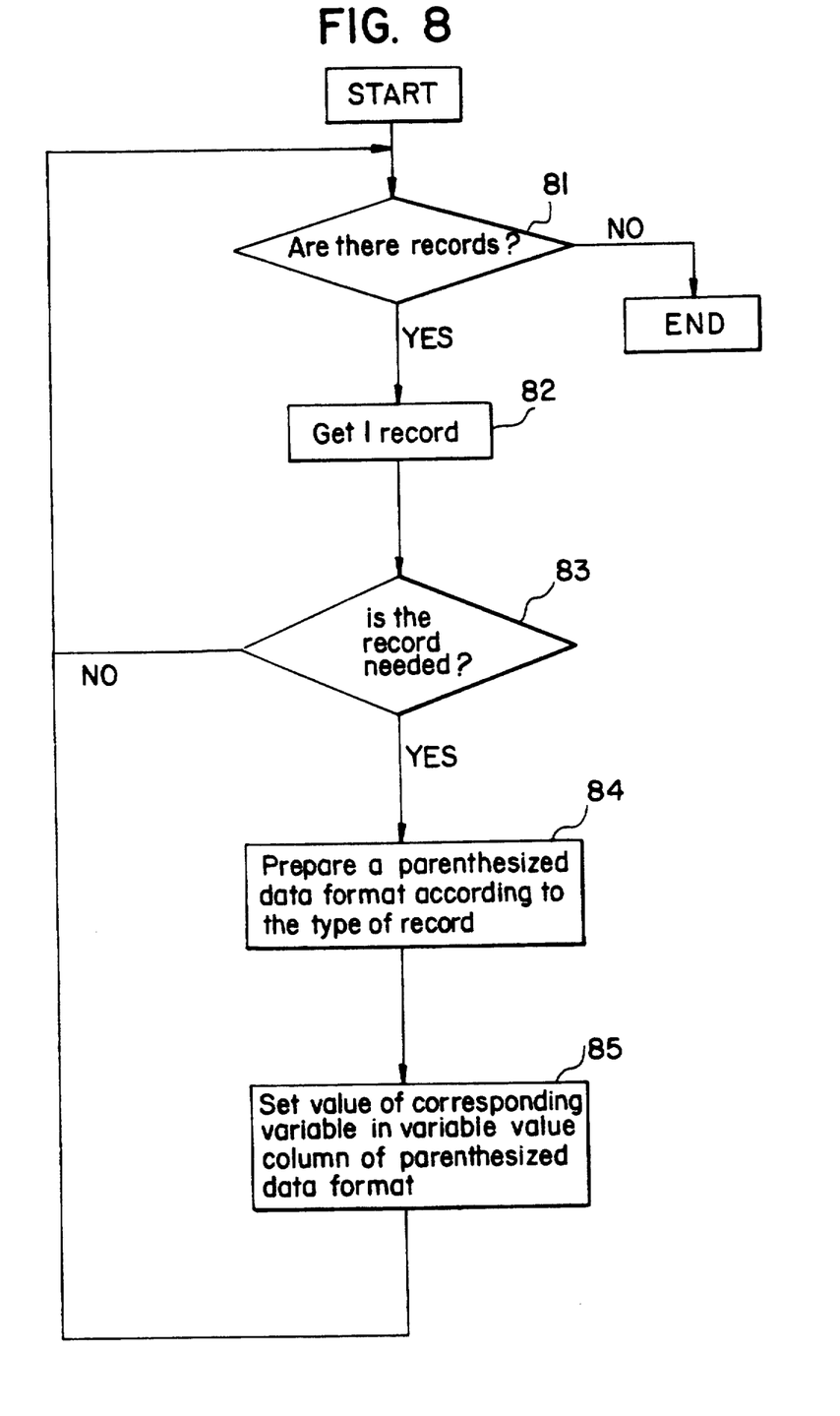
FIG. 8 is a diagram for explaining the processing of system hardware construction data 17 by the knowledge input unit 16 shown in FIG. 1.

Referring now to FIGS. 1, 3 and 8, the knowledge input unit 16 decides whether or not any records exist in the SHC data 17 stored in the main memory unit (step 81). In response to an affirmative decision at this step 81, a record is readout (step 82). Then the knowledge input unit 16 decides whether or not the record readout is required by the declaratively represented rules 14b (step 83). In response to an affirmative decision at this step 83, the knowledge input unit 16 prepares a parenthesized data format according to the type of record (step 84). Next the knowledge input means 16 sets the value of the corresponding variable in the value of variable column of the parenthesized data format (step 85).

The system operating conditions data 3a successively collected into the external memory unit 3 in this manner and the SHC data 17 stored in the main memory unit are referred to by the knowledge input unit 16 after the declaratively represented rules 5b are developed in the work area 14 and incorporated into the pertinent parts of the declaratively represented rules copy 14b in the work area 14.

The user of the computer system, intending to solve a performance problem for the system, actuates the performance analysis/diagnosis information output unit 10 through the I/O unit 2 by interactive processing. In response to this start, the performance analysis/diagnosis information output unit 10 operates the loading unit 13 to collectively develop the know-how rules 5a and the declaratively represented rules 5b stored in the external memory unit 5 in the work area 14 on the main memory unit. These developed know-how rules 5a and declaratively represented rules 5b are represented by reference codes 14a and 14b, respectively, in FIG. 1. Then, the above-mentioned output unit 10 refers to the know-how rules 14a through the access control unit 12 to conduct performance analysis and diagnosis.

This operation will be described in detail below with reference to FIGS. 1 and 9.

Figure 9:
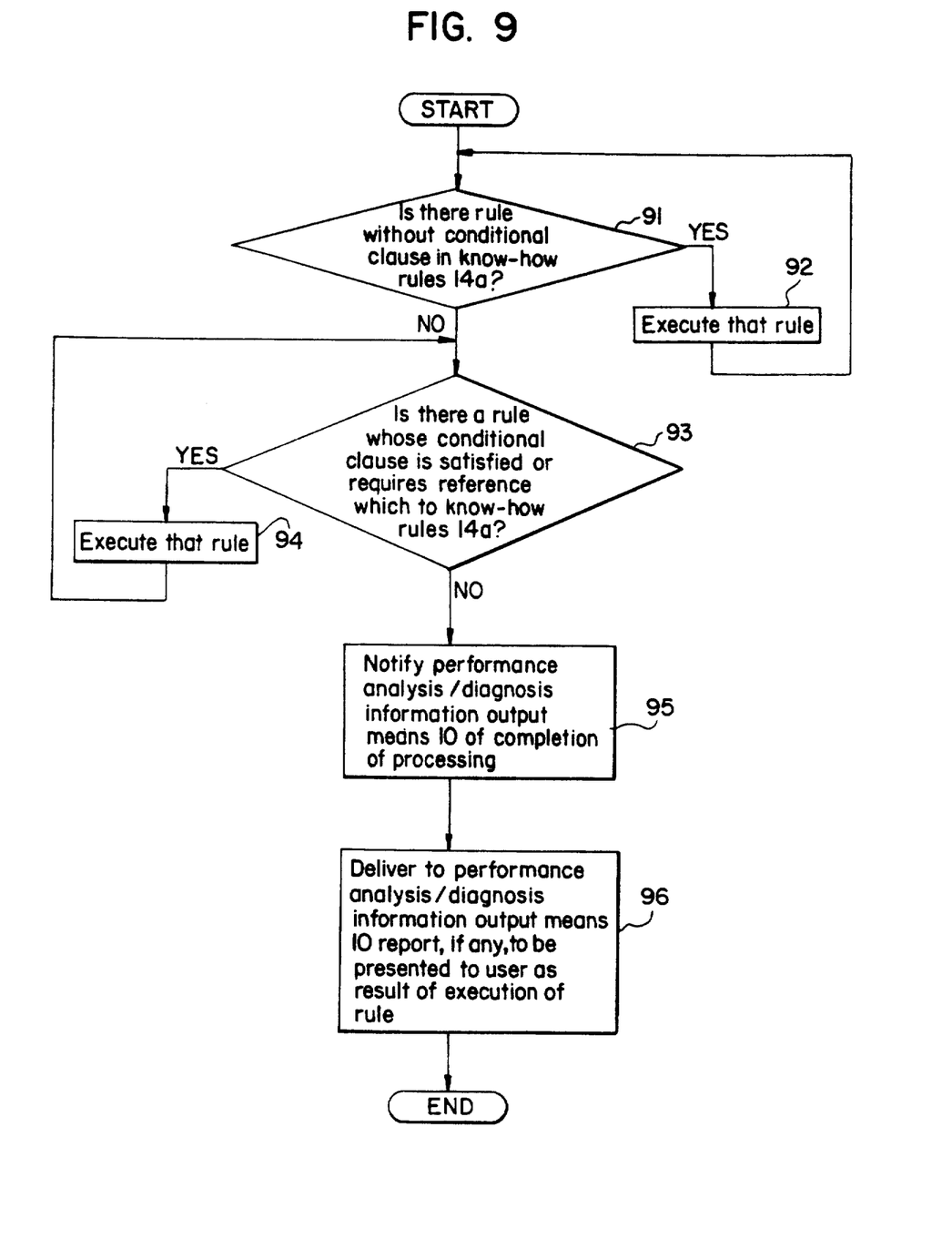
FIG. 9 is a diagram for explaining processing by reference to the know-how rules 14a by access control unit 12 of FIG. 1.

Referring to FIGS. 1 and 9, it is decided whether or not the know-how rules 14a include any rules without a conditional clause (step 91). Rules consisting of executing clauses alone are then executed first (step 92). Examples of such rules include performance evaluation items which are displayed in a menu form on the screen of the I/O unit 2 to urge selection of an evaluation item.

Next, from among the know-how rules 14a, all the rules satisfying the conditional clauses are selected (step 93). The rules selected are successively executed in the order of the relative proximity to the first rule in the know-how rules 14a (step 94). When any of the know-how rules 14a is decided to be a rule whose satisfaction of the conditional clause is yet to be determined, i.e., whose conditional clause requires reference to the declaratively represented rules 14b or an instruction by the user (step 93), the system checks whether or not the conditional clause is satisfied. Such checking would be by reference to the declaratively represented rules 14b or by inquiry addressed to the user through the I/O unit 2. If, as a result of this checking, the condition of the conditional clause is satisfied, the executing clause of that rule will be executed (step 94).

Referring now to FIG. 4, the statement "IF the frequency of missing page faults > 10 times", for instance, in the know-how rules 14a urges reference to the frequency of missing page faults, which is a value of a variable likely to be stored in the declaratively represented rules 14b and, if the frequency of missing page faults referred to is found greater than 10, that rule will be executed.

Figure 10:
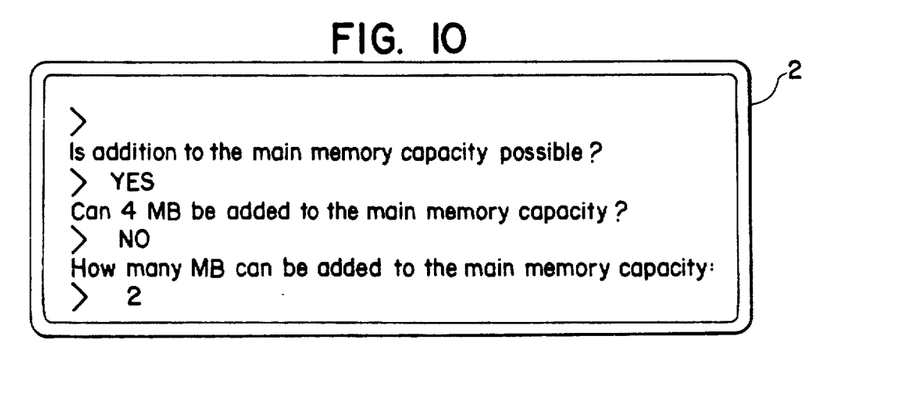
FIG. 10 illustrates how questions to the user and replies by the user are displayed on an input/output (I/O) unit 2.

FIG. 10 illustrates how a question to the user is displayed on the screen of the input/output unit 2 and how the user replies to the question.

Referring again to FIGS. 1 and 9, in response to the execution of a rule in the know-how rules 14a, another rule is executed in accordance with that rule. This catenation of rules calls forth further catenation of rules in response to reference to the declaratively represented rules 14b or a question addressed to the user via the I/O unit 2.

When further catenation of rules ceases to take place in the know-how rules 14a, the access control means 12 notifies the performance analysis/diagnosis information output unit 10 of the completion of processing (step 95).

If there is any report to be presented to the user as the result of rule execution, an output message will be supplied to the I/O unit 2 and the output unit 4 through the performance analysis/diagnosis information output unit 10 (step 96).

Figure 11:
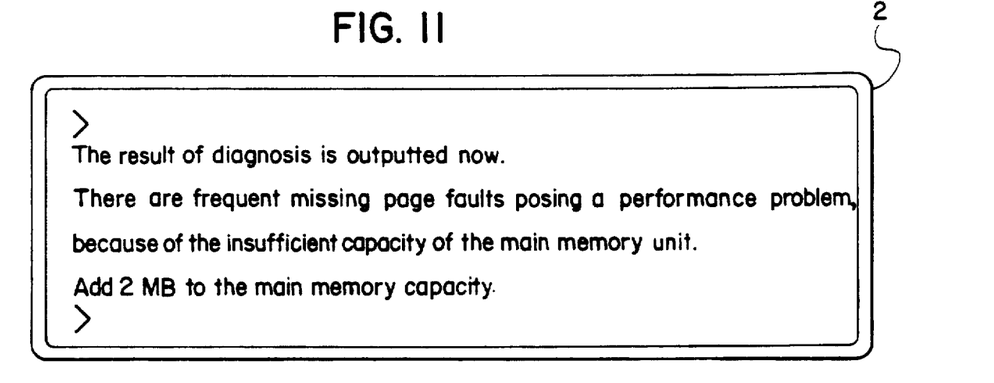
FIG. 11 illustrates a specific example of an output message supplied from performance analysis/diagnosis information output unit 10 to the unit 2.

FIG. 11 illustrates an example of this output message, which informs the user of the way to solve the performance problem of the computer system.

According to the present invention, the user of a computer system intending to solve its performance problem actuates the system through its I/O unit in interactive processing. In response to this actuation, the computer system develops know-how rules and declaratively represented rules from an external memory unit in a work area on its main memory unit. The system repeats catenation of, reference to and updating of judgments within the groups of rules. This repetition leads to a conclusion, i.e., a solution of the performance problem of the system, which is presented to the user of the system through I/O units. As a result the user, even if he is difficient in specialized knowledge or experience, can readily and efficiently decide how to solve the performance problem of the computer system.

What is claimed is:

1. A performance analyzing and diagnosing system for a computer system, comprising:

an input/output unit, responsive to instructions from a user, for providing a starting performance indication;

an access control unit;

a loading unit;

a work area for storing know-how rules and declaratively represented rules, both said rules being necessary to solve performance problems of said computer system;

a performance analysis/diagnosis information output unit, responsive to said starting performance indication from said input/output unit, for starting said access control unit and said loading unit;

said loading unit being responsive to starting by said performance analysis/diagnosis information output unit for inputting said know-how rules and said declaratively represented rules into said work area; and a knowledge input unit, responsive to system hardware construction data input thereto including standard performance value data for devices in said computer system and responsive to system operating conditions data input thereto including actual utilization data for said devices in said computer system, for comparing particular actual utilization data for a particular device of said computer system with particular standard performance value data for said particular device in said computer system to determine whether said particular actual utilization data exceeds said particular standard performance value data for said device and provide excess performance data and for inserting said excess performance data into a particular declaratively represented rule in said work area related to said particular device, said excess performance data then forming particular object data for performance analysis and diagnosis;

said access control unit, responding to starting of said performance analysis/diagnosis information output unit, for using an expert system inference engine for accessing said know-how rules in said work area, for matching said particular object data in said work area with a particular know-how rule in said work area to reach a performance analysis/diagnosis conclusion signal based upon said particular object data and said particular know-how rule, and for transmitting said analysis/diagnosis conclusion signal to said performance analysis/diagnosis information output unit;

said performance analysis/diagnosis information output unit receiving said analysis/diagnosis conclusion signal and outputting said analysis/diagnosis conclusion signal to said input/output unit and to said output unit.

2. A system as in claim 1, further comprising:

a first memory unit for initially storing said know-how rules and said declaratively represented rules;

said loading unit inputting said know-how rules and said declaratively represented rules from said first memory unit into said work area;

a second memory unit for initially storing and inputting said system hardware construction data to said knowledge input unit;

a third memory unit for storing and inputting said system operating conditions data to said knowledge input unit; and a system monitoring unit for monitoring said devices in said computer system to obtain said system operating conditions data and for inputting said system operating conditions data into said third memory unit.

3. A system as in claim 2, further comprising:

an external memory including said first memory unit and said third memory unit;

a main memory including said second memory unit and said work area.

* * * * *